US010623300B2

(12) United States Patent
Ammireddy et al.

(10) Patent No.: US 10,623,300 B2
(45) Date of Patent: Apr. 14, 2020

(54) METHOD AND APPARATUS FOR ADAPTIVE FLOW CONTROL OF LINK-STATE INFORMATION FROM LINK-STATE SOURCE TO BORDER GATEWAY PROTOCOL (BGP)

(71) Applicant: Telefonaktiebolaget LM Ericsson (publ), Stockholm (SE)

(72) Inventors: Amarnath Ammireddy, San Jose, CA (US); Uma S. Chunduri, Fremont, CA (US); Vasant S. Patil, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/089,120

(22) PCT Filed: May 27, 2016

(86) PCT No.: PCT/IB2016/053150
§ 371 (c)(1),
(2) Date: Sep. 27, 2018

(87) PCT Pub. No.: WO2017/168217
PCT Pub. Date: Oct. 5, 2017

(65) Prior Publication Data
US 2019/0319869 A1 Oct. 17, 2019

Related U.S. Application Data

(60) Provisional application No. 62/314,293, filed on Mar. 28, 2016, provisional application No. 62/314,284, filed on Mar. 28, 2016.

(51) Int. Cl.
*H04L 12/755* (2013.01)
*H04L 12/741* (2013.01)
(Continued)

(52) U.S. Cl.
CPC ........ *H04L 45/021* (2013.01); *H04L 12/1854* (2013.01); *H04L 45/02* (2013.01);
(Continued)

(58) Field of Classification Search
CPC ... H04L 12/1854; H04L 45/02; H04L 45/028; H04L 45/54; H04L 45/56; H04L 45/58;
(Continued)

(56) References Cited

U.S. PATENT DOCUMENTS

| 5,128,926 A | 7/1992 | Perlman et al. |
| 2002/0165981 A1 | 11/2002 | Basturk et al. |

(Continued)

OTHER PUBLICATIONS

Gredler, et al., "North-Bound Distribution of Link-State and TE Information using BGP; draft-ietf-idr-ls-distribution-13," IETF Inter-Domain Routing Internet-Draft, https://tools.ietf.org/html/draft-ietf-idr-ls-distribution-13, Oct. 16, 2015, 47 pages.

(Continued)

*Primary Examiner* — Mewale A Ambaye
(74) *Attorney, Agent, or Firm* — Sage Patent Group

(57) ABSTRACT

A method is implemented by a network device functioning as a Border Gateway Protocol (BGP) speaker to adaptively control a flow of link-state information to a peer BGP speaker. The network device stores, in a database, link-state information pertaining to a network in which it operates. The method includes determining that a pending change to the link-state information in the link-state database exists, determining whether a length of a change list queue meets/exceeds a threshold value, holding off on enqueuing link-state information into the change list queue while the length of the change list queue meets or exceeds the threshold value, determining aggregated link-state information to transmit to the peer BGP speaker in response to a determination that the length of the change list queue falls below the threshold value, and enqueuing the aggregated link-state
(Continued)

information into the change list queue for eventual transmission to the peer BGP speaker.

20 Claims, 7 Drawing Sheets

(51) Int. Cl.
| | |
|---|---|
| *H04L 12/715* | (2013.01) |
| *H04L 12/751* | (2013.01) |
| *H04L 12/801* | (2013.01) |
| *H04L 12/18* | (2006.01) |
| *H04L 12/775* | (2013.01) |
| *H04L 29/08* | (2006.01) |

(52) U.S. Cl.
CPC ............ *H04L 45/025* (2013.01); *H04L 45/04* (2013.01); *H04L 45/54* (2013.01); *H04L 45/58* (2013.01); *H04L 47/12* (2013.01); *H04L 67/104* (2013.01)

(58) Field of Classification Search
CPC ....... H04L 45/00; H04L 45/025; H04L 45/04; H04L 67/104
See application file for complete search history.

(56) References Cited

U.S. PATENT DOCUMENTS

| | | | |
|---|---|---|---|
| 2003/0056138 A1* | 3/2003 | Ren | G06F 11/2097 714/4.12 |
| 2011/0026533 A1 | 2/2011 | Nalawade | |
| 2011/0235545 A1* | 9/2011 | Subramanian | H04L 45/04 370/254 |
| 2019/0132232 A1* | 5/2019 | Ammireddy | H04L 45/02 |

OTHER PUBLICATIONS

Previdi, et al., "BGP Link-State extensions for Segment Routing; draft-gredler-idr-bgp-ls-segment-routing-ext-01," IETF, Inter-Domain Routing Internet-Draft, https://tools.ietf.org/id/draft-gredler-idr-bgp-ls-segment-routing-ext-01.txt; Dec. 14, 2015, 31 pages.

Previdi, et al., "IS-IS Traffic Engineering (TE) Metric Extensions; draft-ietf-isis-te-metric-extensions-07," IETF Networking Working Group Internet-Draft, https://tools.ietf.org/html/draft-ietf-isis-te-metric-extensions-07, Jun. 16, 2015, 17 pages.

RFC 1771: Rekhter, et al., "A Border Gateway Protocol 4 (BGP-4)," Network Working Group, Request for comments 1771, Mar. 1995, 57 pages.

* cited by examiner

METHOD AND APPARATUS FOR ADAPTIVE FLOW CONTROL OF LINK-STATE INFORMATION FROM LINK-STATE SOURCE TO BORDER GATEWAY PROTOCOL (BGP)

CROSS-REFERENCE TO RELATED APPLICATIONS

This application is a national stage of International Application No. PCT/IB2016/053150, filed May 27, 2016, which claims the benefit of U.S. Provisional Application No. 62/314,284, filed Mar. 28, 2016, and U.S. Provisional Application No. 62/314,293, filed Mar. 28, 2016, which are hereby incorporated by reference.

TECHNICAL FIELD

Embodiments of the invention relate to the field of computer networks; and more specifically, to providing adaptive flow control of link-state information via Border Gateway Protocol Link-State (BGP-LS).

BACKGROUND

Border Gateway Protocol (BGP) is a protocol for exchanging routing and reachability information between autonomous systems (ASes). An AS is a set of routers under a single technical administration. An AS typically employs an interior gateway protocol (IGP) to exchange network topology information among routers within the AS. Examples of IGPs include link-state routing protocols such as Intermediate System to Intermediate System (IS-IS) and Open Shortest Path First (OSPF).

Border Gateway Protocol Link-State (BGP-LS) uses BGP as a carrier for network topology and reachability information collected by an IGP. BGP-LS allows a BGP speaker to share network topology and reachability information collected by the BGP speaker (e.g., link-state information collected using IS-IS or OSPF) with a peer BGP speaker (e.g., another BGP speaker located in another AS) via BGP. For this purpose, BGP-LS defines a link-state network layer reachability information (NLRI) encoding format that is used to provide network topology and reachability information to external components. Each link-state NLRI may describe either a node, a link, or a prefix.

Support for BGP-LS adds non-trivial overhead to IGP operation in terms of processing and update handling. This is made worse in situations where the BGP speaker is busy (e.g., performing other non-BGP tasks). It is important for IGPs to be agile and responsive since they are typically responsible for providing network topology and reachability information within an AS and also since non-connected protocols (e.g., BGP) depend on IGPs for network topology and reachability information.

SUMMARY

A method is implemented by a network device functioning as a Border Gateway Protocol (BGP) speaker to adaptively control a flow of link-state information to a peer BGP speaker. The network device stores, in a link-state database, link-state information pertaining to a network in which the network device operates. The method includes determining that a pending change to the link-state information stored in the link-state database exists, determining whether a length of a change list queue meets or exceeds a threshold value, holding off on enqueuing link-state information into the change list queue while the length of the change list queue meets or exceeds the threshold value, determining aggregated link-state information to transmit to the peer BGP speaker in response to a determination that the length of the change list queue falls below the threshold value, and enqueuing the aggregated link-state information into the change list queue for eventual transmission to the peer BGP speaker.

A network device is configured to function as a Border Gateway Protocol (BGP) speaker. The network device is to adaptively control a flow of link-state information to a peer BGP speaker. The network device includes a link-state database to store link-state information pertaining to a network in which the network device operates. The network device further includes a set of one or more processors and a non-transitory machine-readable storage medium having stored therein a link-state module. The link-state module, when executed by the set of one or more processors, causes the network device to determine that a pending change to the link-state information stored in the link-state database exists, determine whether a length of a change list queue meets or exceeds a threshold value, hold off on enqueuing link-state information into the change list queue while the length of the change list queue meets or exceeds the threshold value, determine aggregated link-state information to transmit to the peer BGP speaker in response to a determination that the length of the change list queue falls below the threshold value, and enqueue the aggregated link-state information into the change list queue for eventual transmission to the peer BGP speaker.

A non-transitory machine-readable storage medium has computer code stored therein that is to be executed by a set of one or more processors of a network device functioning as a Border Gateway Protocol (BGP) speaker. The computer code, when executed by the network device, causes the network device to perform operations for adaptively controlling a flow of link-state information to a peer BGP speaker. The network device is to store, in a link-state database, link-state information pertaining to a network in which the network device operates. The operations include determining that a pending change to the link-state information stored in the link-state database exists, determining whether a length of a change list queue meets or exceeds a threshold value, holding off on enqueuing link-state information into the change list queue while the length of the change list queue meets or exceeds the threshold value, determining aggregated link-state information to transmit to the peer BGP speaker in response to a determination that the length of the change list queue falls below the threshold value, and enqueuing the aggregated link-state information into the change list queue for eventual transmission to the peer BGP speaker.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
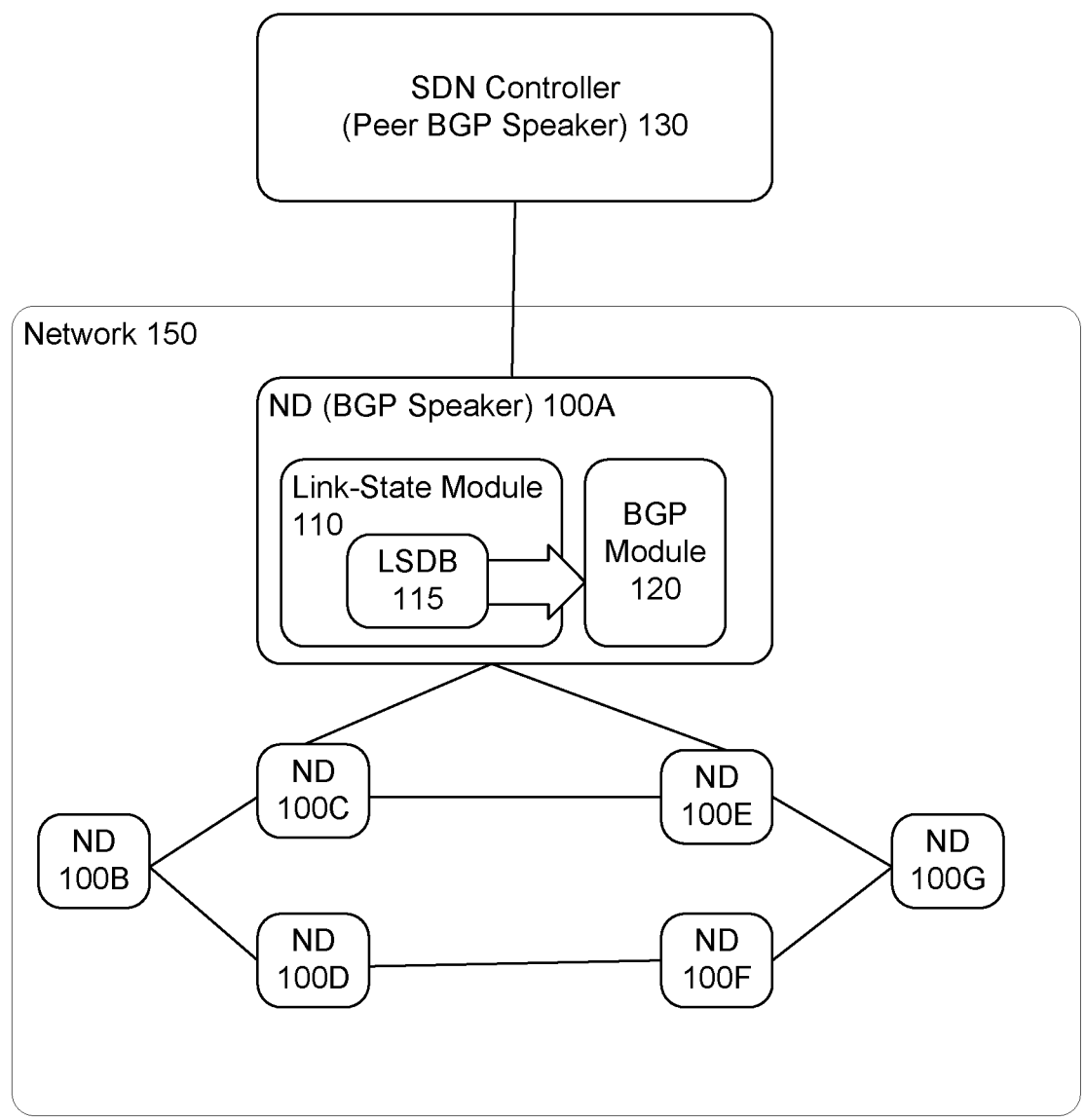
FIG. 1 is a diagram illustrating a system in which adaptive flow control of link-state information can be implemented, according to some embodiments.

The following description describes methods and apparatus for adaptively providing link-sate updates to a peer Border Gateway Protocol (BGP) speaker based on a perceived availability of the peer BGP speaker. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Border Gateway Protocol Link-State (BGP-LS) is a protocol that allows a BGP speaker to provide link-state information collected by the BGP speaker to a peer BGP speaker. The BGP speaker may execute a link-state module and a BGP module. The link-state module and BGP module can be configured such that the link-state module provides link-state information to the BGP module so that the BGP module can provide this link-state information to a peer BGP speaker (e.g., in another autonomous system (AS) or within the same AS) via BGP-LS. Link-state information can be carried by BGP-LS using an Address Family Identifier (AFI) and Subsequent Address Family Identifier (SAFI) designated for link-state information (e.g., AFI 16388 and SAFI 71). The BGP speaker may execute the link-state module (e.g., Interior Gateway Protocol (IGP) daemon) to collect link-state information pertaining to a network in which the BGP speaker operates. The link-state module may collect link-state information by executing an IGP such as Intermediate System to Intermediate System (IS-IS) or Open Shortest Path First (OSPF) within a network or through other means. The link-state module may store the collected link-state information in a link-state database. Any time the link-state information in the link-state database changes (e.g., due to updates received via an IGP), the link-state module may provide updated link-state information reflecting those changes to the BGP module. The BGP speaker may execute the BGP module (e.g., BGP daemon) to initiate transmission of the updated link-state information provided by the link-state module to a peer BGP speaker via BGP-LS. This serves to keep the peer BGP speaker up-to-date with the latest changes to the network topology and reachability information. However, in situations where the network topology or reachability fluctuates rapidly (e.g., due to flapping links or changes in Traffic Engineering (TE) information), the link-state module may end up having to provide an overwhelming number of updates to the BGP module in a short amount of time. This can severely degrade the performance of the BGP speaker and in some cases, the entire network. In a link flapping scenario, the link-state module may end up providing link-state information updates to the BGP module (for eventual transmission to the peer BGP speaker) for all of the transient changes that occur during the link flapping, even though those transient changes may not be that relevant or useful for the peer BGP speaker.

Embodiments described herein overcome the disadvantages of existing techniques by adaptively controlling the flow of link-state information to the peer BGP speaker based on the availability of the BGP module. According to some embodiments, the link-state module infers the availability of the BGP module based on the length of a change list queue (e.g., the number of entries or elements in the change list queue). The change list queue is a queue that is used for storing link-state information that is to be transmitted to the peer BGP speaker. If the length of the change list queue meets or exceeds a threshold value, then the link-state module deems the BGP module to be busy. Otherwise, if the length of the change list queue falls below the threshold value, then the link-state module deems the BGP module to be available. According to some embodiments, if the length of the change list queue meets or exceeds the threshold value (the BGP module is deemed to be busy), the link-state module holds off on enqueuing link-state information into the change list queue for as long as the length of the change list queue meets or exceeds the threshold value. When the length of the change list queue falls below the threshold value (the BGP module is deemed to be available), the link-state module determines aggregated link-state information to transmit to the peer BGP speaker. The aggregated link-state information reflects the most recent state of the link-state information stored in the link-state database. The link-state module then enqueues the aggregated link-state information into the change list queue for eventual transmission to the peer BGP speaker. In this way, the BGP speaker provides the peer BGP speaker with aggregated link-state information that reflects the most recent state of the link-state information stored in the link-state database, and any transient changes that occurred while the BGP module was deemed to be busy are not transmitted to the peer BGP speaker. An advantage of the technique described above is that it reduces the amount of overhead that the link-state module incurs to support BGP-LS (e.g., the link-state module holds off on providing link-state information to the BGP module when the BGP module is busy). Moreover, when the link-state module resumes providing link-state information to the BGP module, it provides aggregated link-state information reflecting the most recent state of the link-state information stored in the link-state database, and ignores any transient changes that occurred while the BGP module was deemed to be busy. Other embodiments are also described and claimed.

FIG. 1 is a diagram illustrating a system in which adaptive flow control of link-state information can be implemented, according to some embodiments. The system includes a network 150 and a Software Defined Networking (SDN) controller 130 communicatively coupled to a network device 100A in the network 150. The network 150 includes network devices 100A-G that are communicatively coupled over one or more links. In one embodiment, the network devices 100 are routers. The network devices 100 in network 150 may execute an IGP (e.g., IS-IS or OSPF) to exchange network topology and reachability information with each other.

Network device 100A is communicatively coupled to the SDN controller 130 and includes a link-state module 110 and a BGP module 120. The link-state module 110 is operable to collect and store network topology and reachability information pertaining to the network 150 in a link-state database (LSDB) 115. The link-state module 110 may collect network topology and reachability information (including TE information) pertaining to the network 150 by executing an IGP within the network 150 or through other means (e.g., through static configurations or through a Resource Reservation Protocol (RSVP)). The network topology and reachability information pertaining to the network 150 may be referred to herein as link-state information of the network 150. The link-state information may include information regarding nodes, links, and/or prefixes, or any combination thereof. The link-state information stored in the link-state database 115 may be updated as the network topology and/or reachability of the network changes. The link-state module 110 is operable to communicate with the BGP module 120. In one embodiment, the link-state module 110 may communicate with the BGP module 120 using an inter-process communication (IPC) technique. The BGP module 120 is operable to allow the network device 100A to communicate with a peer BGP speaker (e.g., the SDN controller 130) via BGP and/or BGP-LS.

The link-state module 110 is operable to provide updated link-state information pertaining to the network 150 to the BGP module 120. The updated link-state information may indicate, for example, that an attribute of a particular link in the network 150 has changed or that a particular link has been added/removed in the network 150. The BGP module 120 is operable to initiate transmission of the updated link-state information provided by the link-state module 110 to the SDN controller 130 via BGP-LS or similar protocol (e.g., link-state information can be carried by BGP-LS using an AFI/SAFI designated for link-state information). In this way the BGP module 120 is operable to relay the updated link-state information provided by the link-state module 110 to a peer BGP speaker (e.g., the SDN controller 130) via BGP-LS or similar protocol. For this purpose, the network device 100A may be regarded as the BGP speaker and the SDN controller 130 may be regarded as a peer BGP speaker of network device 100A. In one embodiment, the network device 100A functions as a BGP route reflector for the network 150.

In one embodiment, the link-state module 110 maintains a change list queue. In one embodiment, when the link-state information stored in the link-state database 115 changes, the link-state module 110 may enqueue link-state information reflecting those changes into the change list queue for eventual transmission to the SDN controller 130. The BGP module 120 may dequeue the link-state information from the change list queue and initiate a BGP-LS transmission of that link-state information to the SDN controller 130. In this way, the network device 100A is able to provide the SDN controller 130 with updated link-state information pertaining to the network 150 via BGP-LS.

In one embodiment, the link-state module 110 adaptively controls the flow of link-state information to the SDN controller 130 based on the availability of the BGP module 120. According to some embodiments, the link-state module 110 infers the availability of the BGP module 120 based on the length of the change list queue. If the length of the change list queue meets or exceeds a threshold value, then the link-state module 110 deems the BGP module 120 to be busy. Otherwise, if the length of the change list queue falls below the threshold value, then the link-state module 110 deems the BGP module 120 to be available. According to some embodiments, if the length of the change list queue meets or exceeds the threshold value (the BGP module 120 is deemed to be busy), the link-state module 110 holds off on enqueuing link-state information into the change list queue for as long as the length of the change list queue meets or exceeds the threshold value. When the length of the change list queue falls below the threshold value (the BGP module 120 is deemed to be available), the link-state module 110 determines aggregated link-state information to transmit to the SDN controller 130. In one embodiment, the aggregated link-state information reflects the most recent state of the link-state information stored in the link-state database 115. The link-state module 110 enqueues the aggregated link-state information into the change list queue for eventual transmission to the SDN controller 130. The BGP module 120 may dequeue the aggregated link-state information from the change list queue and initiate transmission of the aggregated link-state information to the SDN controller 130. In this way, network device 100A is able to provide the SDN controller 130 with aggregated link-state information that reflects the most recent state of the link-state information stored in the link-state database 115, and any transient changes that occurred while the BGP module 120 was deemed to be busy are not transmitted to the SDN controller 130. An advantage of the technique described above is that it reduces the amount of overhead that the link-state module 110 and BGP module 120 incur to support BGP-LS (e.g., the link-state module 110 holds off on providing link-state information to the BGP module 120 when the BGP module 120 is busy). Moreover, the link-state module 110 only provides the BGP module 120 with link-state information reflecting the most recent state of the link-state information stored in the link-state database (e.g., the aggregated link-state information), and any transient changes that occurred while the BGP module 120 was deemed to be busy are ignored.

It should be noted that the system described with reference to FIG. 1 is provided by way of example and not limitation. It should be understood that in other embodiments, the network 150 can include a different number of network devices 100 and that the network devices 100 can be connected in a different topology than shown in the diagram. Also, it should be understood that network device 100A can perform adaptive flow control of link-state information with a peer BGP speaker other than the SDN controller 130.

Figure 2:
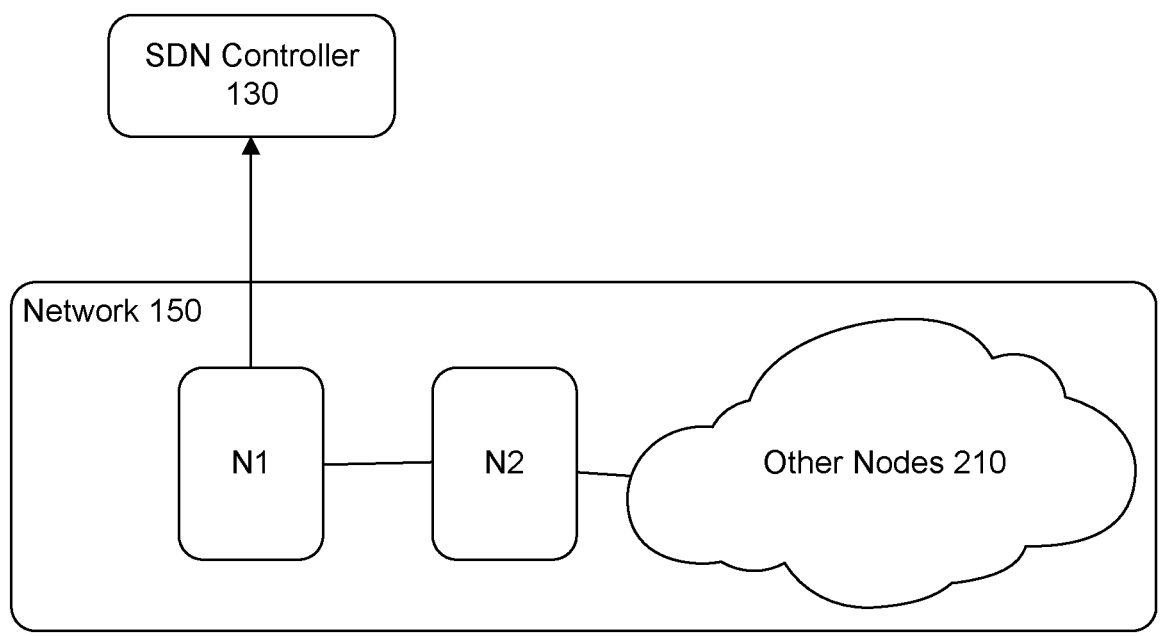
FIG. 2 is a diagram illustrating a scenario where adaptive flow control of link-state information may reduce processing overhead, according to some embodiments.

FIG. 2 is a diagram illustrating a scenario where adaptive flow control of link-state information may reduce processing overhead, according to some embodiments. As shown, a network 150 includes node N1, node N2, and a group of other nodes 210. Node N1 is connected to node N2 and there are a large group of other nodes 210 (e.g., a group of 1000 nodes) behind node N2. The nodes in the network 150 may execute an IGP (e.g., IS-IS or OSPF) to exchange network topology and reachability information with each other. Node N1 is connected to an SDN controller 130 and is responsible for providing link-state information pertaining to the network 150 to the SDN controller 130. Node N1 and the SDN controller 130 support BGP-LS. As such, the link-state module 110 of node N1 needs to export complete network topology and reachability information to the BGP module 120 of node N1 (for eventual transmission to the SDN controller 130 via BGP-LS). According to conventional techniques, if the link between node N1 and node N2 is unstable and starts flapping, the link-state module 110 of node N1 has to export the updated link-state information to the BGP module 120 of node N1 every time the link flaps. If the BGP module 120 is busy performing other tasks and unable to process the link-state information fast enough, this may cause the change list queue to grow very large over time. To make things worse, the link flapping will result in the link-state module 110 providing link-state information that negates link-state information that was provided earlier.

The adaptive flow control of link-state information described herein can help mitigate the problems discussed above that arise from link flapping by holding off on generating link-state information when the BGP module 120 is deemed to be busy. When the BGP module 120 is subsequently deemed to become available, the link-state module 110 may provide aggregated link-state information to the BGP module 120 that reflects the most recent state of the link-state information stored in the link-state database 115. This allows the link-state module 110 and the BGP module 120 to consume less computational resources (e.g., memory and processor).

Figure 3A:
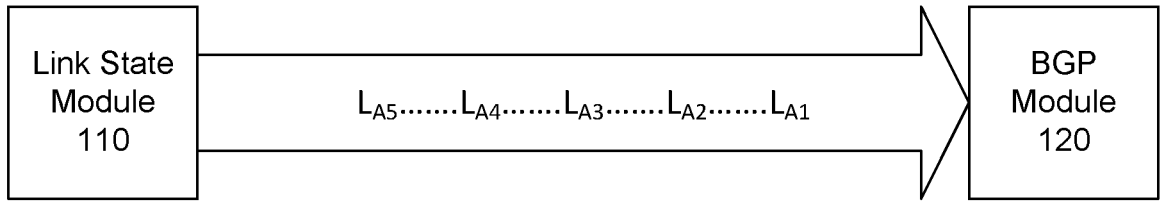
FIG. 3A is a diagram illustrating an example of the link-state information that is provided to a BGP module with and without adaptive flow control, according to some embodiments.
Figure 3A:
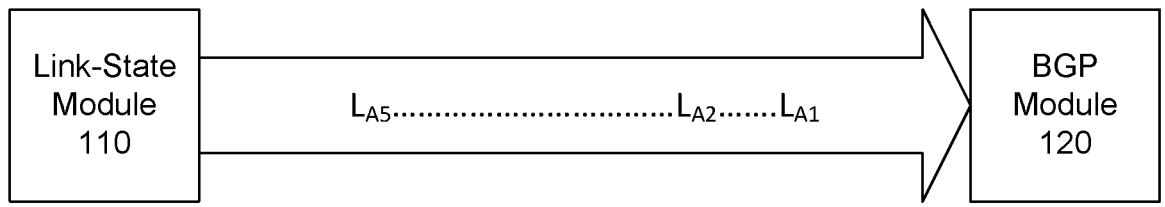

FIG. 3A is a diagram illustrating an example of the link-state information that is provided to a BGP module with and without adaptive flow control, according to some embodiments. Assume there is a network (e.g., network 150) that includes a node S and a link L and that an attribute of link L changes frequently. The attribute of a link can be, for example, the available bandwidth of the link. Assume that the attribute of the link changes over time as follows:

$t_1 \rightarrow L_{A1}$
(BGP module becomes busy)
$t_2 \rightarrow L_{A2}$
(length of change list queue reaches threshold value)
$t_3 \rightarrow L_{A3}$
$t_4 \rightarrow L_{A4}$
(BGP module becomes available)
$t_5 \rightarrow L_{A5}$
Where $A_i \mathrel{!}= A_j$ where (i=1 . . . 5, j=1 . . . 5)

At time $t_1$, the state of the link is $L_{A1}$, where $L_{A1}$ denotes that the link L has attribute $A_1$. At time $t_2$, the state of the link is $L_{A2}$, where $L_{A2}$ denotes that the link L has attribute $A_2$, and so on until time $t_5$. Assume that the BGP module 120 of node S becomes busy performing non-link-state tasks at time $t_2$ and becomes available to perform link-state tasks at time $t_5$. Also, assume that the length of the change list queue reaches a threshold value between time $t_2$ and time $t_3$.

Without adaptive flow control of link-state information (illustrated by the diagram on the top), the link-state module 110 of node S ends up providing all the intermediary (and stale) states of the link to the BGP module 120 of node S. That is, the link-state module 110 enqueues link-state information into the change list queue regarding $L_{A1}$, $L_{A2}$, $L_{A3}$, $L_{A4}$, and $L_{A5}$ in that order.

In contrast, with adaptive flow control of link-state information (illustrated by the diagram on the bottom), once the length of the change list queue reaches a threshold value (e.g., between time $t_2$ and time $t_3$ in this example), the link-state module 110 holds off on providing link-state information to the BGP module 120 (e.g., by holding off on enqueuing link-state information into the change list queue) while the length of the change list queue meets or exceeds the threshold value. When the BGP module 120 drains the change list queue such that the length of the change list queue falls below the threshold value (e.g., at time $t_5$ in this example), the link-state module 110 starts providing link-state information to the BGP module 120 again. That is, the link-state module 110 enqueues link-state information into the change list queue regarding $L_{A1}$, $L_{A2}$, and $L_{A5}$, but not $L_{A3}$ and $L_{A4}$ (which are stale anyways).

Figure 3B:
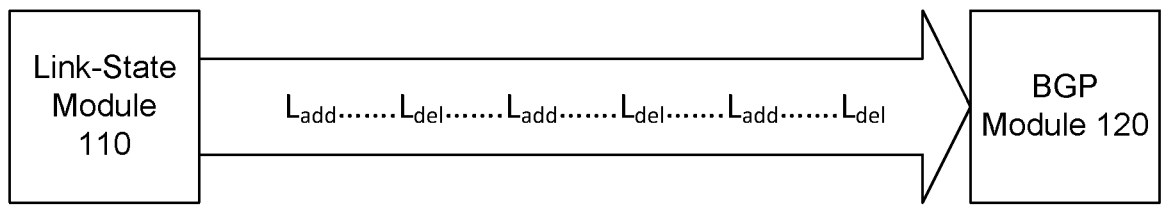
FIG. 3B is a diagram illustrating another example of the link-state information that is provided to a BGP module with and without adaptive flow control of link-state information, according to some embodiments.
Figure 3B:
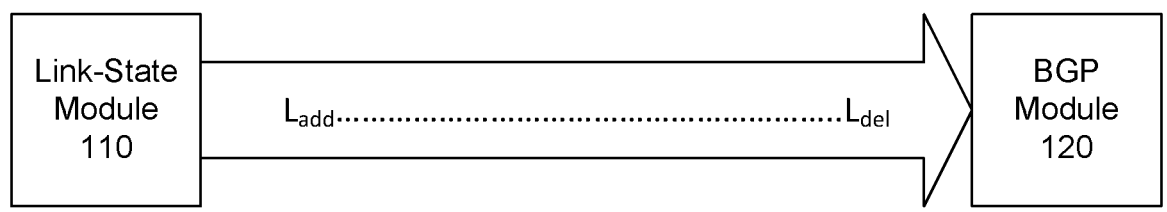

FIG. 3B is a diagram illustrating another example of the link-state information that is provided to a BGP module with and without adaptive flow control of link-state information, according to some embodiments. As before, assume there is a network (e.g., network 150) that includes a node S and a link L. In this example, assume that the link L flaps, which causes the link-state module 110 of node S to receive link-state advertisements from another node in the network (e.g., via an IGP) with and without the link every time the link goes up and down, respectively. Assume that $L_{del}$ represents the deletion of the link L and $L_{add}$ represents the addition of the link L. Without adaptive flow control of link-state information (illustrated by the diagram on the top), the link-state module 110 of node S ends up providing link-state information to the BGP module 120 of node S each time the link flaps. That is, the link-state module 110 enqueues link-state information into the change list queue regarding $L_{del}$, $L_{add}$, $L_{del}$, $L_{add}$, $L_{del}$, and $L_{add}$ in that order.

In contrast, with adaptive flow control of link-state information (illustrated by the diagram on the bottom), once the length of the change list queue reaches a threshold value (e.g., after the first $L_{del}$ in this example), the link-state module 110 holds off on providing link-state information to the BGP module 120 (e.g., by holding off on enqueuing link-state information into the change list queue) while the length of the change list queue meets or exceeds the threshold value. When the BGP module 120 drains the change list queue such that the length of the change list queue falls below the threshold value (e.g., after the last $L_{add}$), the link-state module 110 provides aggregated link-state information reflecting the final state of the link (e.g., $L_{add}$ in this example) to the BGP module 120. As a result, in this example, the link-state module 110 enqueues link-state information into the change list queue regarding the first $L_{del}$ and the last $L_{add}$, but not the intermediary link addition and link deletions.

Figure 4:
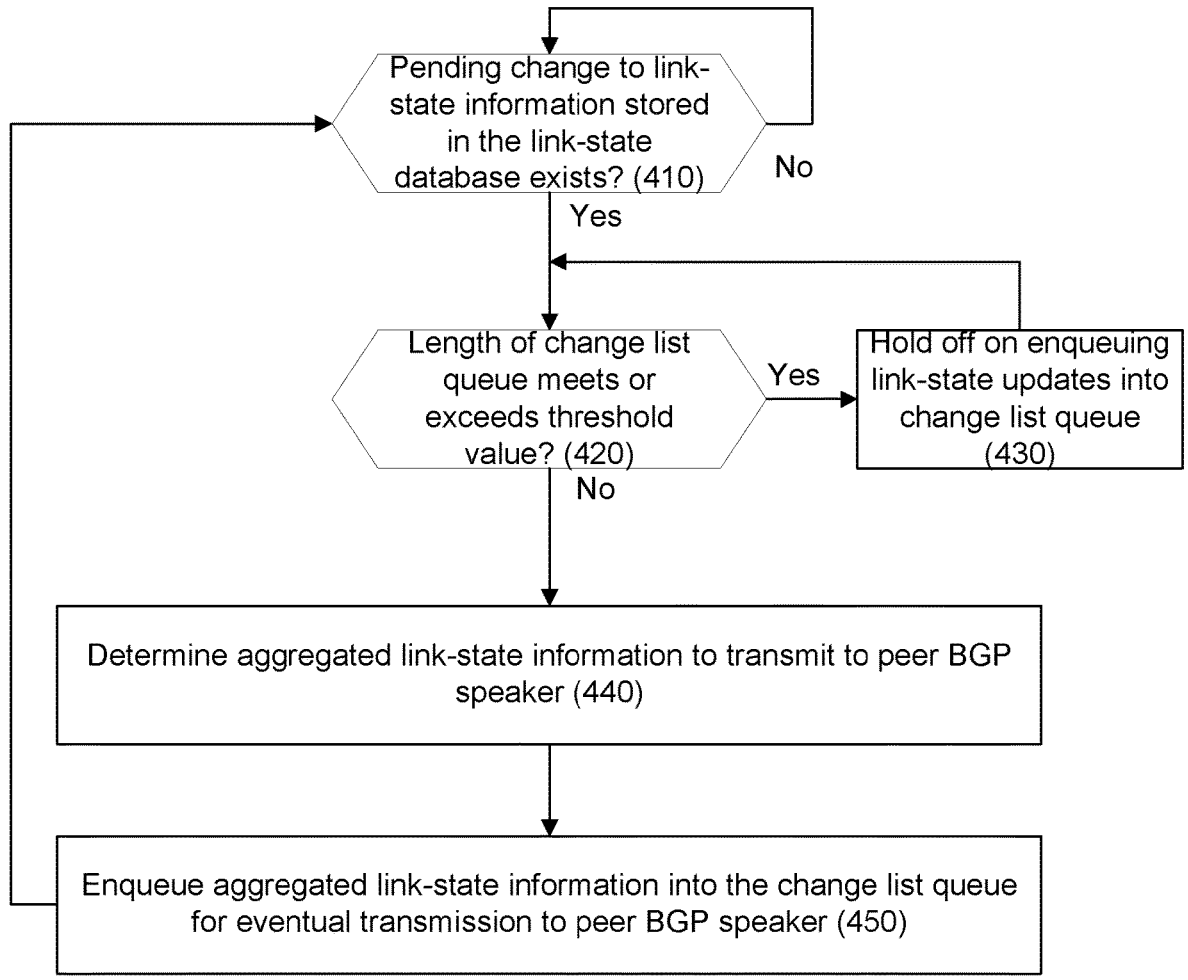
FIG. 4 is a flow diagram of a process for providing adaptive flow control of link-state information, according to some embodiments.

FIG. 4 is a flow diagram of a process for providing adaptive flow control of link-state information, according to some embodiments. In one embodiment, the process may be implemented by a network device 100 (e.g., a router). The process may be implemented using hardware, firmware, software, or any combination thereof. The network device 100 may function as a BGP speaker and may be communicatively coupled to a peer BGP speaker (e.g., an SDN controller 130). The network device 100 may maintain link-state information pertaining to a network 150 in which the network device 100 operates. The link-state information may be stored in a link-state database 115. The link-state information may include information regarding nodes, links, and/or prefixes. The link-state information may be collected and/or updated using an IGP (e.g., IS-IS or OSPF) or other means (e.g., static link-state information). The operations in this flow diagram will be described with reference to the exemplary embodiments of the other figures. However, it should be understood that the operations of the flow diagram can be performed by embodiments of the invention other than those discussed with reference to the other figures, and the embodiments of the invention discussed with reference to these other figures can perform operations different than those discussed with reference to the flow diagram.

The network device 100 determines whether a pending change to the link-state information stored in the link-state database 115 exists (decision block 410). A pending change to the link-state information is a change to the link-state information that has not been scheduled to be relayed to the peer BGP speaker yet. If there are no pending changes to the link-state information, then the network device 100 waits until a pending change exists.

If a pending change to the link-state information stored in the link-state database 115 exists, then the network device 100 determines whether the length of a change list queue meets or exceeds a threshold value (decision block 420). The change list queue can be any type of data structure that stores link-state information for eventual transmission to the peer BGP speaker. In one embodiment, the threshold value is a pre-determined value (e.g., set by a network administrator or dynamically determined).

If the length of the change list queue meets or exceeds the threshold value, this indicates that the BGP module 120 of the network device 100 and/or peer BGP speaker is busy. In this case, the network device 100 holds off on enqueuing link-state information into the change list queue (block 430).

Returning to decision block 420, if the length of the change list queue falls below the threshold value, then this indicates that the BGP module 120 and/or peer BGP speaker is available to process link-state information. In this case, the network device 100 determines aggregated link-state information to transmit to the peer BGP speaker (block 440). The aggregated link-state information may include updated information regarding nodes, links, and/or prefixes. In one embodiment, the aggregated link-state information reflects the most recent state of the link-state information stored in the link-state database 115 after the length of the change list queue falls below the threshold value. One or more changes to the link-state information stored in the link-state database 115 may have occurred while the network device 100 was holding off on enqueuing link-state information into the change list queue. For example, an attribute of a link may have changed several times during this time. The aggregated link-state information would reflect the most recent status of this attribute. In one embodiment, the network device 100 keeps track of the changes to the link-state information stored in the link-state database 115 while the network device 100 holds off on enqueuing link-state information into the change list queue. The network device 100 may keep track of the most recent status of the link-state information in the link-state database 115 and ignore or override any stale information. This allows the network device 100 to provide aggregated link-state information, when needed.

The network devices 100 then enqueues the aggregated link-state information into the change list queue for eventual transmission to the peer BGP speaker (block 450). The network device 100 may then dequeue the aggregated link-state information from the change list queue and transmit the aggregated link-state information to the peer BGP speaker. In one embodiment, the aggregated link-state information is transmitted to the peer BGP speaker via BGP-LS (e.g., link-state information can be carried by BGP-LS using an AFI/SAFI designated for link-state information). In this way, the network device 100 provides adaptive flow control of link-state information to the peer BGP speaker. The network device 100 effectively ignores any transient changes to the link-state information while the length of the change list queue meets or exceeds the threshold value (which implies that the BGP module 120 and/or peer BGP speaker is busy). When the length of the change list queue falls below the threshold value (which implies that the BGP module 120 and/or peer BGP speaker is available), the network device 100 transmits aggregated link-state information to the peer BGP speaker that reflects the most recent status of the link-state information stored in the link-state database 115, and thereby avoids transmitting the transient changes to the link-state information that occurred while the BGP module 120 and/or peer BGP speaker was deemed to be busy.

Figure 5A:
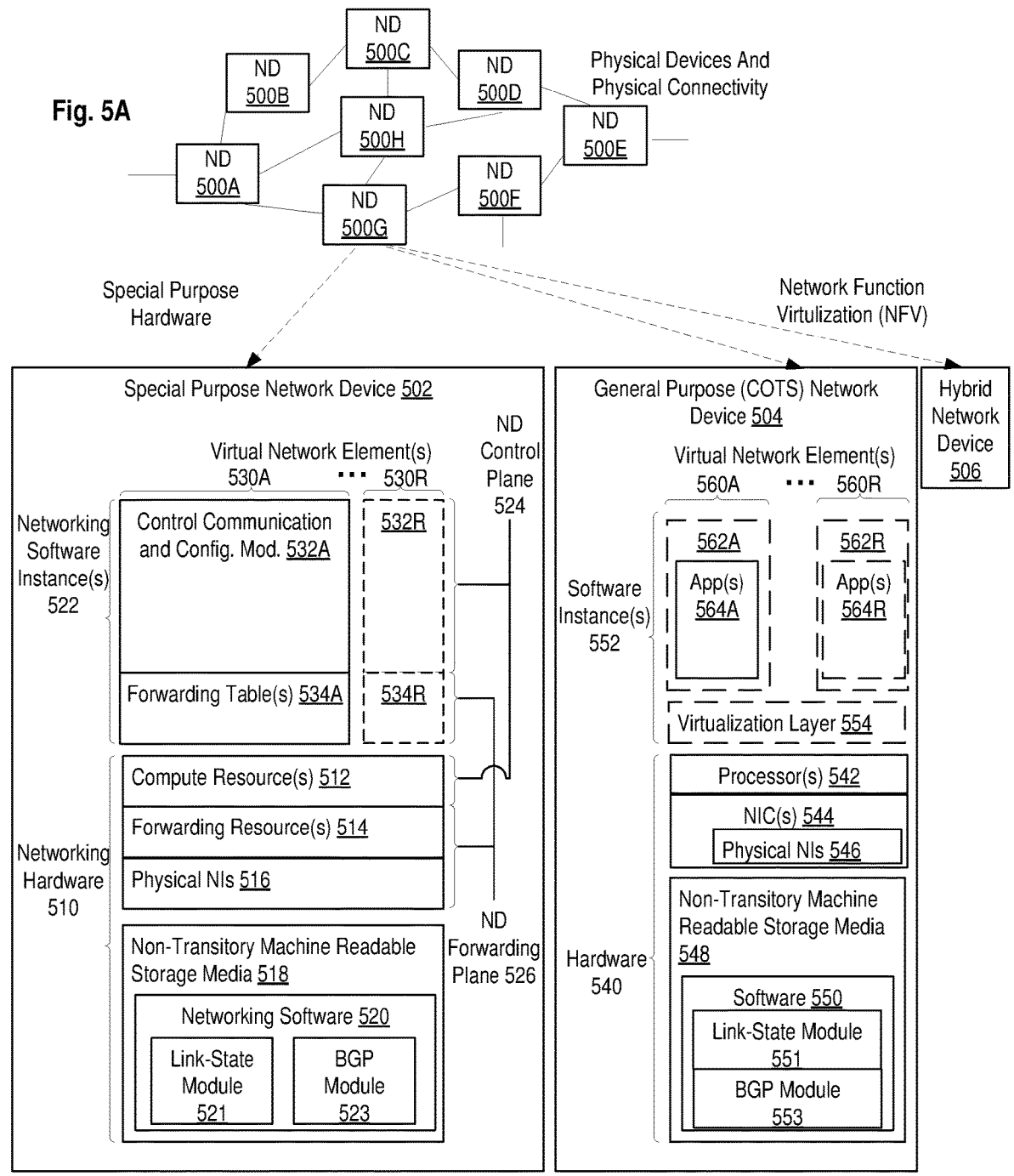
FIG. 5A illustrates connectivity between network devices (NDs) within an exemplary network, as well as three exemplary implementations of the NDs, according to some embodiments.

FIG. 5A illustrates connectivity between network devices (NDs) within an exemplary network, as well as three exemplary implementations of the NDs, according to some embodiments of the invention. FIG. 5A shows NDs 500A-H, and their connectivity by way of lines between 500A-500B, 500B-500C, 500C-500D, 500D-500E, 500E-500F, 500F-500G, and 500A-500G, as well as between 500H and each of 500A, 500C, 500D, and 500G. These NDs are physical devices, and the connectivity between these NDs can be wireless or wired (often referred to as a link). An additional line extending from NDs 500A, 500E, and 500F illustrates that these NDs act as ingress and egress points for the network (and thus, these NDs are sometimes referred to as edge NDs; while the other NDs may be called core NDs).

Two of the exemplary ND implementations in FIG. 5A are: 1) a special-purpose network device 502 that uses custom application-specific integrated-circuits (ASICs) and a special-purpose operating system (OS); and 2) a general purpose network device 504 that uses common off-the-shelf (COTS) processors and a standard OS.

The special-purpose network device 502 includes networking hardware 510 comprising compute resource(s) 512 (which typically include a set of one or more processors), forwarding resource(s) 514 (which typically include one or more ASICs and/or network processors), and physical network interfaces (NIs) 516 (sometimes called physical ports), as well as non-transitory machine readable storage media 518 having stored therein networking software 520. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 500A-H. During operation, the networking software 520 may be executed by the networking hardware 510 to instantiate a set of one or more networking software instance(s) 522. Each of the networking software instance(s) 522, and that part of the networking hardware 510 that executes that network software instance (be it hardware dedicated to that networking software instance and/or time slices of hardware temporally shared by that networking software instance with others of the networking software instance(s) 522), form a separate virtual network element 530A-R. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A).

Software 520 can include code such as link-state module 521 and BGP module 523, which when executed by networking hardware 510, causes the special-purpose network device 502 to perform operations of one or more embodiments of the present invention as part networking software instances 522. For example, the link-state module 521 and the BGP module 523, when executed by network hardware 510, may cause the special-purpose network device 502 to perform operations described above with respect to the link-state module 110 and BGP module 120, respectively.

The special-purpose network device 502 is often physically and/or logically considered to include: 1) a ND control plane 524 (sometimes referred to as a control plane) comprising the compute resource(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the compute resource(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R.

Figure 5B:
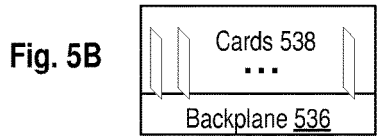
FIG. 5B illustrates an exemplary way to implement a special-purpose network device, according to some embodiments.

FIG. 5B illustrates an exemplary way to implement the special-purpose network device 502 according to some embodiments of the invention. FIG. 5B shows a special-purpose network device including cards 538 (typically hot pluggable). While in some embodiments the cards 538 are of two types (one or more that operate as the ND forwarding plane 526 (sometimes called line cards), and one or more that operate to implement the ND control plane 524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 536 (e.g., a first full mesh coupling the line cards and a second full mesh coupling all of the cards).

Returning to FIG. 5A, the general purpose network device 504 includes hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein software 550. During operation, the processor(s) 542 execute the software 550 to instantiate one or more sets of one or more applications 564A-R. While one embodiment does not implement virtualization, alternative embodiments may use different forms of virtualization. For example, in one such alternative embodiment the virtualization layer 554 represents the kernel of an operating system (or a shim executing on a base operating system) that allows for the creation of multiple instances 562A-R called software containers that may each be used to execute one (or more) of the sets of applications 564A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 554 represents a hypervisor (sometimes referred to as a virtual machine monitor (VMM)) or a hypervisor executing on top of a host operating system, and each of the sets of applications 564A-R is run on top of a guest operating system within an instance 562A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 540, directly on a hypervisor (in which case the unikernel is sometimes described as running within a LibOS virtual machine), or in a software container, embodiments can be implemented fully with unikernels running directly on a hypervisor represented by virtualization layer 554, unikernels running within software containers represented by instances 562A-R, or as a combination of unikernels and the above-described techniques (e.g., unikernels and virtual machines both run directly on a hypervisor, unikernels and sets of applications that are run in different software containers).

The instantiation of the one or more sets of one or more applications 564A-R, as well as virtualization if implemented, are collectively referred to as software instance(s) 552. Each set of applications 564A-R, corresponding virtualization construct (e.g., instance 562A-R) if implemented, and that part of the hardware 540 that executes them (be it hardware dedicated to that execution and/or time slices of hardware temporally shared), forms a separate virtual network element(s) 560A-R.

The virtual network element(s) 560A-R perform similar functionality to the virtual network element(s) 530A-R—e.g., similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 562A-R to VNEs also apply to embodiments where such a finer level of granularity and/or unikernels are used.

In certain embodiments, the virtualization layer 554 includes a virtual switch that provides similar forwarding services as a physical Ethernet switch. Specifically, this virtual switch forwards traffic between instances 562A-R and the NIC(s) 544, as well as optionally between the instances 562A-R; in addition, this virtual switch may enforce network isolation between the VNEs 560A-R that by policy are not permitted to communicate with each other (e.g., by honoring virtual local area networks (VLANs)).

Software 550 can include code such as link-state module 551 and BGP module 553, which when executed by processor(s) 542, cause the general purpose network device 504 to perform operations of one or more embodiments of the present invention as part software instances 562A-R. For example, the link-state module 551 and the BGP module 553, when executed by processor(s) 542, may cause the general purpose network device 504 to perform operations described above with respect to the link-state module 110 and BGP module 120, respectively.

The third exemplary ND implementation in FIG. 5A is a hybrid network device 506, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 530A-R, VNEs 560A-R, and those in the hybrid network device 506) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 5C:
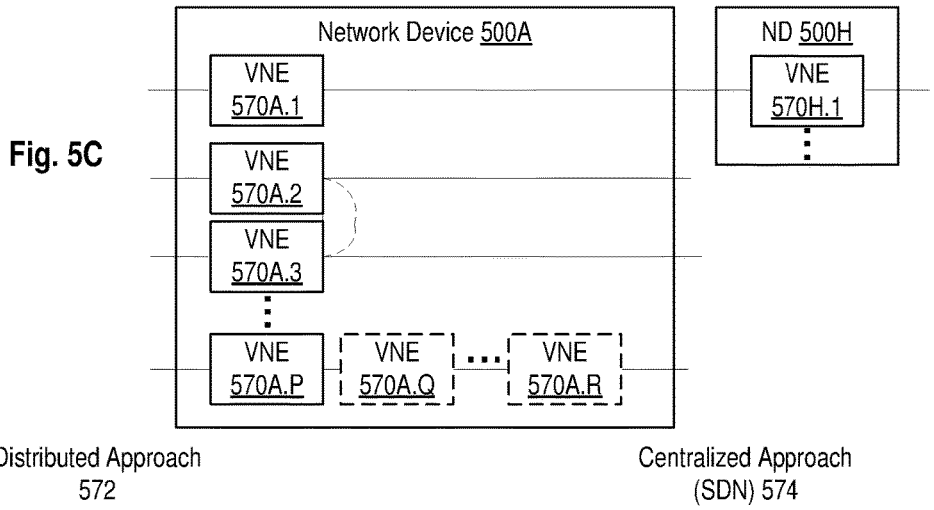
FIG. 5C illustrates various exemplary ways in which virtual network elements (VNEs) may be coupled, according to some embodiments.

FIG. 5C illustrates various exemplary ways in which VNEs may be coupled according to some embodiments of the invention. FIG. 5C shows VNEs 570A.1-570A.P (and optionally VNEs 570A.Q-570A.R) implemented in ND 500A and VNE 570H.1 in ND 500H. In FIG. 5C, VNEs 570A.1-P are separate from each other in the sense that they can receive packets from outside ND 500A and forward packets outside of ND 500A; VNE 570A.1 is coupled with VNE 570H.1, and thus they communicate packets between their respective NDs; VNE 570A.2-570A.3 may optionally forward packets between themselves without forwarding them outside of the ND 500A; and VNE 570A.P may optionally be the first in a chain of VNEs that includes VNE 570A.Q followed by VNE 570A.R (this is sometimes referred to as dynamic service chaining, where each of the VNEs in the series of VNEs provides a different service—e.g., one or more layer 4-7 network services). While FIG. 5C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 5A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 5A may also host one or more such servers (e.g., in the case of the general purpose network device 504, one or more of the software instances 562A-R may operate as servers; the same would be true for the hybrid network device 506; in the case of the special-purpose network device 502, one or more such servers could also be run on a virtualization layer executed by the compute resource(s) 512); in which case the servers are said to be co-located with the VNEs of that ND.

A virtual network is a logical abstraction of a physical network (such as that in FIG. 5A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 5D:
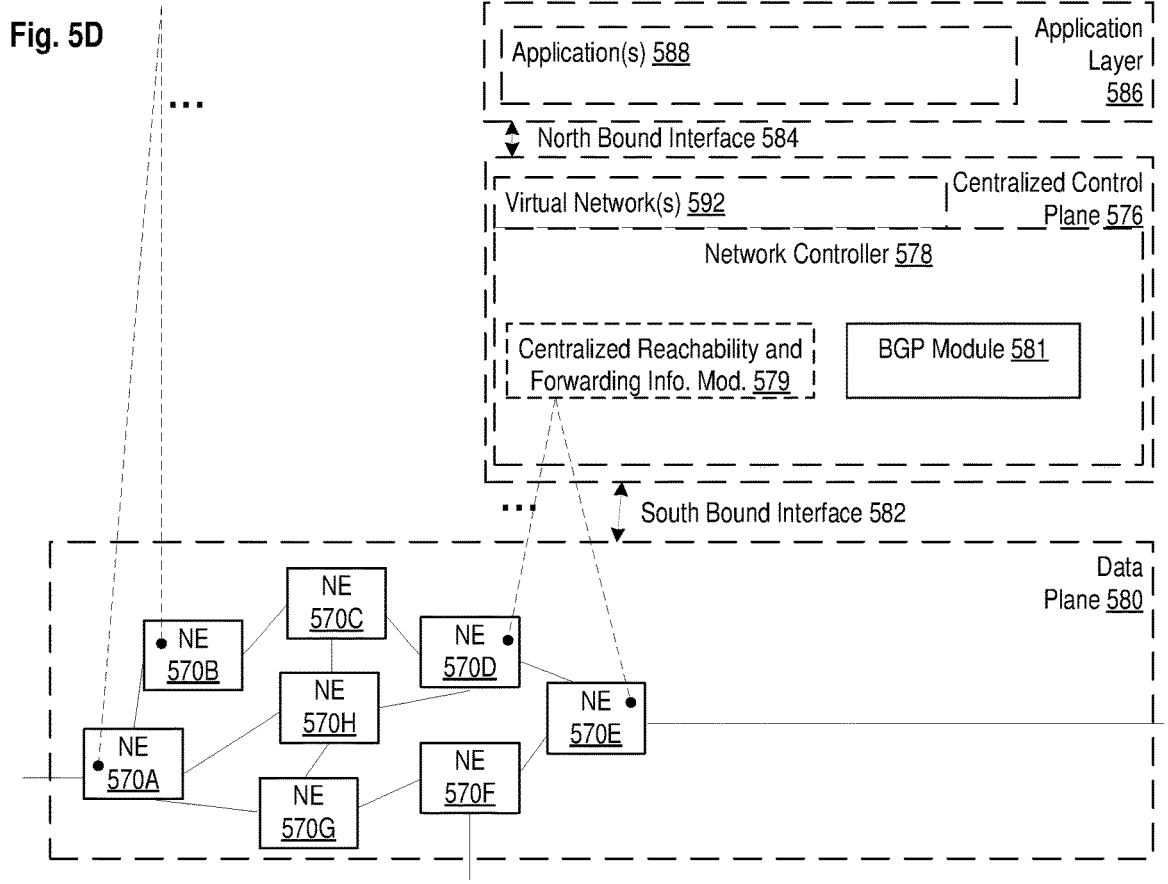
FIG. 5D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 5D illustrates a network with a single network element on each of the NDs of FIG. 5A, and within this straight forward approach contrasts a traditional distributed approach (commonly used by traditional routers) with a centralized approach for maintaining reachability and forwarding information (also called network control), according to some embodiments of the invention. Specifically, FIG. 5D illustrates network elements (NEs) 570A-H with the same connectivity as the NDs 500A-H of FIG. 5A.

FIG. 5D illustrates that the distributed approach 572 distributes responsibility for generating the reachability and forwarding information across the NEs 570A-H; in other words, the process of neighbor discovery and topology discovery is distributed.

For example, where the special-purpose network device 502 is used, the control communication and configuration module(s) 532A-R of the ND control plane 524 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 570A-H (e.g., the compute resource(s) 512 executing the control communication and configuration module(s) 532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 524. The ND control plane 524 programs the ND forwarding plane 526 with information (e.g., adjacency and route information) based on the routing structure(s). For example, the ND control plane 524 programs the adjacency and route information into one or more forwarding table(s) 534A-R (e.g., Forwarding Information Base (FIB), Label Forwarding Information Base (LFIB), and one or more adjacency structures) on the ND forwarding plane 526. For layer 2 forwarding, the ND can store one or more bridging tables that are used to forward data based on the layer 2 information in that data. While the above example uses the special-purpose network device 502, the same distributed approach 572 can be implemented on the general purpose network device 504 and the hybrid network device 506.

FIG. 5D illustrates that a centralized approach 574 (also known as software defined networking (SDN)) that decouples the system that makes decisions about where traffic is sent from the underlying systems that forwards traffic to the selected destination. The illustrated centralized approach 574 has the responsibility for the generation of reachability and forwarding information in a centralized control plane 576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 576 has a south bound interface 582 with a data plane 580 (sometime referred to the infrastructure layer, network forwarding plane, or forwarding plane (which should not be confused with a ND forwarding plane)) that includes the NEs 570A-H (sometimes referred to as switches, forwarding elements, data plane elements, or nodes). The centralized control plane 576 includes a network controller 578, which includes a centralized reachability and forwarding information module 579 that determines the reachability within the network and distributes the forwarding information to the NEs 570A-H of the data plane 580 over the south bound interface 582 (which may use the OpenFlow protocol). Thus, the network intelligence is centralized in the centralized control plane 576 executing on electronic devices that are typically separate from the NDs. In one embodiment, the network controller 578 may include a BGP module 581 that when executed by the network controller 578, causes the network controller 578 to perform operations of one or more embodiments described herein above. For example, the BGP module 581, when executed by the network controller 578, may cause the network controller 578 to perform operations for communicating with one or more NE 570 via BGP-LS.

For example, where the special-purpose network device 502 is used in the data plane 580, each of the control communication and configuration module(s) 532A-R of the ND control plane 524 typically include a control agent that provides the VNE side of the south bound interface 582. In this case, the ND control plane 524 (the compute resource(s) 512 executing the control communication and configuration module(s) 532A-R) performs its responsibility for participating in controlling how data (e.g., packets) is to be routed (e.g., the next hop for the data and the outgoing physical NI for that data) through the control agent communicating with the centralized control plane 576 to receive the forwarding information (and in some cases, the reachability information) from the centralized reachability and forwarding information module 579 (it should be understood that in some embodiments of the invention, the control communication and configuration module(s) 532A-R, in addition to communicating with the centralized control plane 576, may also play some role in determining reachability and/or calculating forwarding information—albeit less so than in the case of a distributed approach; such embodiments are generally considered to fall under the centralized approach 574, but may also be considered a hybrid approach).

While the above example uses the special-purpose network device 502, the same centralized approach 574 can be implemented with the general purpose network device 504 (e.g., each of the VNE 560A-R performs its responsibility for controlling how data (e.g., packets) is to be routed (e.g., the next hop for the data and the outgoing physical NI for that data) by communicating with the centralized control plane 576 to receive the forwarding information (and in some cases, the reachability information) from the centralized reachability and forwarding information module 579; it should be understood that in some embodiments of the invention, the VNEs 560A-R, in addition to communicating with the centralized control plane 576, may also play some role in determining reachability and/or calculating forwarding information—albeit less so than in the case of a distributed approach) and the hybrid network device 506. In fact, the use of SDN techniques can enhance the NFV techniques typically used in the general purpose network device 504 or hybrid network device 506 implementations as NFV is able to support SDN by providing an infrastructure upon which the SDN software can be run, and NFV and SDN both aim to make use of commodity server hardware and physical switches.

FIG. 5D also shows that the centralized control plane 576 has a north bound interface 584 to an application layer 586, in which resides application(s) 588. The centralized control plane 576 has the ability to form virtual networks 592 (sometimes referred to as a logical forwarding plane, network services, or overlay networks (with the NEs 570A-H of the data plane 580 being the underlay network)) for the application(s) 588. Thus, the centralized control plane 576 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 5D shows the distributed approach 572 separate from the centralized approach 574, the effort of network control may be distributed differently or the two combined in certain embodiments of the invention. For example: 1)

embodiments may generally use the centralized approach (SDN) 574, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 574, but may also be considered a hybrid approach.

While FIG. 5D illustrates the simple case where each of the NDs 500A-H implements a single NE 570A-H, it should be understood that the network control approaches described with reference to FIG. 5D also work for networks where one or more of the NDs 500A-H implement multiple VNEs (e.g., VNEs 530A-R, VNEs 560A-R, those in the hybrid network device 506). Alternatively or in addition, the network controller 578 may also emulate the implementation of multiple VNEs in a single ND. Specifically, instead of (or in addition to) implementing multiple VNEs in a single ND, the network controller 578 may present the implementation of a VNE/NE in a single ND as multiple VNEs in the virtual networks 592 (all in the same one of the virtual network(s) 592, each in different ones of the virtual network(s) 592, or some combination). For example, the network controller 578 may cause an ND to implement a single VNE (a NE) in the underlay network, and then logically divide up the resources of that NE within the centralized control plane 576 to present different VNEs in the virtual network(s) 592 (where these different VNEs in the overlay networks are sharing the resources of the single VNE/NE implementation on the ND in the underlay network).

Figure 5E:
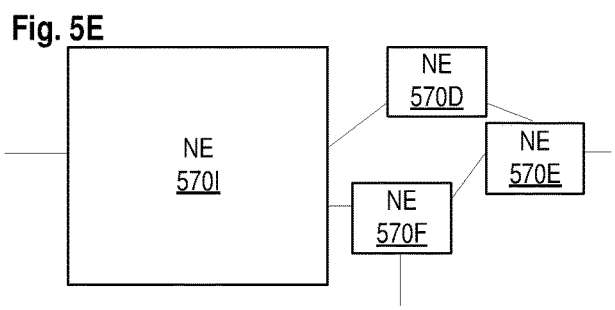
FIG. 5E illustrates the simple case of where each of the NDs implements a single NE, but a centralized control plane has abstracted multiple of the NEs in different NDs into (to represent) a single NE in one of the virtual network(s), according to some embodiments.
Figure 5F:
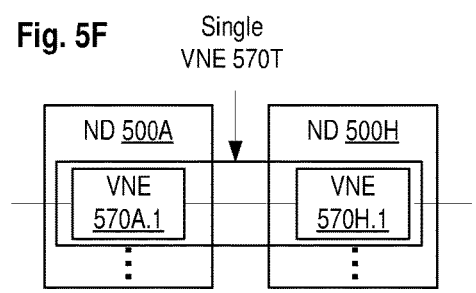
FIG. 5F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 5E and 5F respectively illustrate exemplary abstractions of NEs and VNEs that the network controller 578 may present as part of different ones of the virtual networks 592. FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 570I in one of the virtual network(s) 592 of FIG. 5D, according to some embodiments of the invention. FIG. 5E shows that in this virtual network, the NE 570I is coupled to NE 570D and 570F, which are both still coupled to NE 570E.

FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments of the invention. Thus, the abstraction of a NE or VNE can span multiple NDs.

While some embodiments of the invention implement the centralized control plane 576 as a single entity (e.g., a single instance of software running on a single electronic device), alternative embodiments may spread the functionality across multiple entities for redundancy and/or scalability purposes (e.g., multiple instances of software running on different electronic devices).

Figure 6:
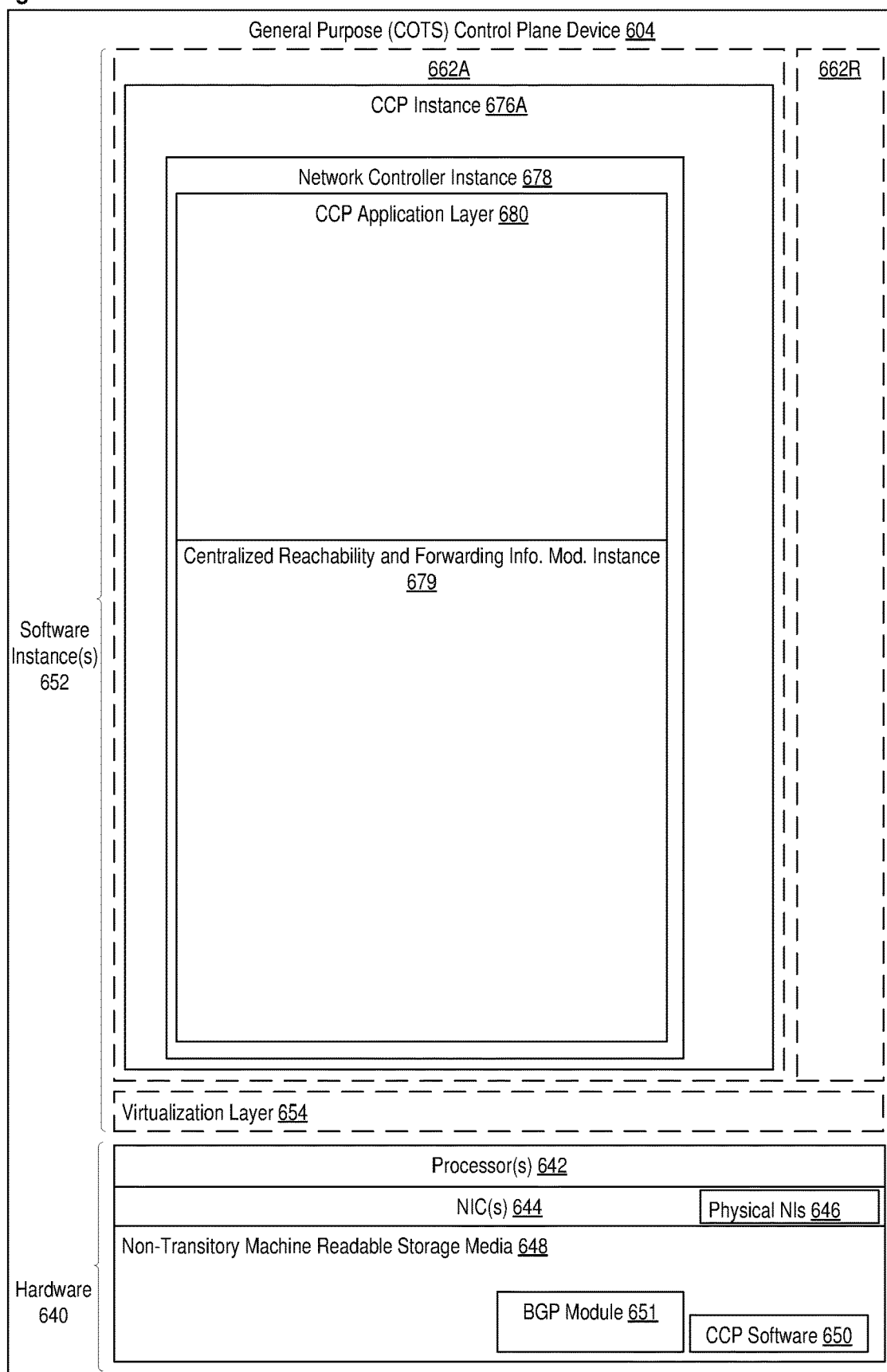
FIG. 6 illustrates a general purpose control plane device with centralized control plane (CCP) software, according to some embodiments.

Similar to the network device implementations, the electronic device(s) running the centralized control plane 576, and thus the network controller 578 including the centralized reachability and forwarding information module 579, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 6 illustrates, a general purpose control plane device 604 including hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein centralized control plane (CCP) software 650 and a BGP module 651.

In embodiments that use compute virtualization, the processor(s) 642 typically execute software to instantiate a virtualization layer 654 (e.g., in one embodiment the virtualization layer 654 represents the kernel of an operating system (or a shim executing on a base operating system) that allows for the creation of multiple instances 662A-R called software containers (representing separate user spaces and also called virtualization engines, virtual private servers, or jails) that may each be used to execute a set of one or more applications; in another embodiment the virtualization layer 654 represents a hypervisor (sometimes referred to as a virtual machine monitor (VMM)) or a hypervisor executing on top of a host operating system, and an application is run on top of a guest operating system within an instance 662A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 640, directly on a hypervisor represented by virtualization layer 654 (in which case the unikernel is sometimes described as running within a LibOS virtual machine), or in a software container represented by one of instances 662A-R). Again, in embodiments where compute virtualization is used, during operation an instance of the CCP software 650 (illustrated as CCP instance 676A) is executed (e.g., within the instance 662A) on the virtualization layer 654. In embodiments where compute virtualization is not used, the CCP instance 676A is executed, as a unikernel or on top of a host operating system, on the "bare metal" general purpose control plane device 604. The instantiation of the CCP instance 676A, as well as the virtualization layer 654 and instances 662A-R if implemented, are collectively referred to as software instance(s) 652.

In some embodiments, the CCP instance 676A includes a network controller instance 678. The network controller instance 678 includes a centralized reachability and forwarding information module instance 679 (which is a middleware layer providing the context of the network controller 578 to the operating system and communicating with the various NEs), and an CCP application layer 680 (sometimes referred to as an application layer) over the middleware layer (providing the intelligence required for various network operations such as protocols, network situational awareness, and user-interfaces). At a more abstract level, this CCP application layer 680 within the centralized control plane 576 works with virtual network view(s) (logical view(s) of the network) and the middleware layer provides the conversion from the virtual networks to the physical view.

The BGP module 651 can be executed by hardware 640 to perform operations of one or more embodiments of the present invention as part of software instances 652. For example, the BGP module 651 can be executed by hardware 640 to perform operations for communicating with one or more NEs (e.g., NEs 570A-H) via BGP-LS.

The centralized control plane 576 transmits relevant messages to the data plane 580 based on CCP application layer 680 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 580 may receive different messages, and thus different forwarding information. The data plane 580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 580, the packet (or a subset of the packet header and content) is typically forwarded to the centralized control plane 576. The centralized control plane 576 will then program forwarding table entries into the data plane 580 to accommodate packets belonging to the flow of the unknown packet. Once a specific forwarding table entry has been programmed into the data plane 580 by the centralized control plane 576, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

An embodiment of the invention may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method implemented by a network device functioning as a Border Gateway Protocol (BGP) speaker to adaptively control a flow of link-state information to a peer BGP speaker, where the network device stores, in a link-state database, link-state information pertaining to a network in which the network device operates, the method comprising:
   determining an existence of a pending change to the link-state information stored in the link-state database;
   determining whether a length of a change list queue meets or exceeds a threshold value;
   holding off on enqueuing link-state information into the change list queue while the length of the change list queue meets or exceeds the threshold value;
   determining aggregated link-state information to transmit to the peer BGP speaker in response to determining that the length of the change list queue falls below the threshold value; and
   enqueuing the aggregated link-state information into the change list queue for eventual transmission to the peer BGP speaker.

2. The method of claim 1, wherein the aggregated link-state information reflects a most recent state of the link-state information stored in the link-state database after the length of the change list queue falls below the threshold value.

3. The method of claim 1, further comprising:
   dequeuing the aggregated link-state information from the change list queue; and
   transmitting the aggregated link-state information to the peer BGP speaker.

4. The method of claim 3, wherein the aggregated link-state information is transmitted to the peer BGP speaker via Border Gateway Protocol Link-State (BGP-LS).

5. The method of claim 1, further comprising:
   executing an Interior Gateway Protocol (IGP) in the network; and
   updating the link-state information stored in the link-state database according to the IGP.

6. The method of claim 5, wherein the IGP is Intermediate System to Intermediate System (IS-IS).

7. The method of claim 5, wherein the IGP is Open Shortest Path First (OSPF).

8. A network device configured to function as a Border Gateway Protocol (BGP) speaker, the network device to adaptively control a flow of link-state information to a peer BGP speaker, the network device comprising:
   a link-state database to store link-state information pertaining to a network in which the network device operates;
   a set of one or more processors; and
   a non-transitory machine-readable storage medium having stored therein a link-state module, which when executed by the set of one or more processors, causes the network device to determine an existence of a pending change to the link-state information stored in the link-state database, determine whether a length of a change list queue meets or exceeds a threshold value, hold off on enqueuing link-state information into the change list queue while the length of the change list queue meets or exceeds the threshold value, determine aggregated link-state information to transmit to the peer BGP speaker in response to a determine that the length of the change list queue falls below the threshold value, and enqueue the aggregated link-state information into the change list queue for eventual transmission to the peer BGP speaker.

9. The network device of claim 8, wherein the aggregated link-state information reflects a most recent state of the link-state information stored in the link-state database after the length of the change list queue falls below the threshold value.

10. The network device of claim 8, wherein the non-transitory machine-readable storage medium has further stored therein a BGP module, which when executed by the set of one or more processors, causes the network device to dequeue the aggregated link-state information from the change list queue and initiate transmission of the aggregated link-state information to the peer BGP speaker.

11. The network device of claim 10, wherein the BGP module, when executed by the set of one or more processors, further causes the network device to transmit the aggregated link-state information to the peer BGP speaker via Border Gateway Protocol Link-State (BGP-LS).

12. The network device of claim 8, wherein the link-state module, when executed by the set of one or more processors, causes the network device to execute an Interior Gateway Protocol (IGP) in the network and update the link-state information stored in the link-state database according to the IGP.

13. The network device of claim 12, wherein the IGP is Intermediate System to Intermediate System (IS-IS).

14. A non-transitory machine-readable medium having computer code stored therein, which when executed by a set of one or more processors of a network device functioning as a Border Gateway Protocol (BGP) speaker, causes the network device to perform operations for adaptively controlling a flow of link-state information to a peer BGP speaker, the network device to store, in a link-state database, link-state information pertaining to a network in which the network device operates, the operations comprising:

determining an existence of a pending change to the link-state information stored in the link-state database;

determining whether a length of a change list queue meets or exceeds a threshold value;

holding off on enqueuing link-state information into the change list queue while the length of the change list queue meets or exceeds the threshold value;

determining aggregated link-state information to transmit to the peer BGP speaker in response to determining that the length of the change list queue falls below the threshold value; and enqueuing the aggregated link-state information into the change list queue for eventual transmission to the peer BGP speaker.

15. The non-transitory machine-readable medium of claim 14, wherein the aggregated link-state information reflects a most recent state of the link-state information stored in the link-state database after the length of the change list queue falls below the threshold value.

16. The non-transitory machine-readable medium of claim 14, wherein the computer code, when executed by the set of one or more processors of the network device, causes the network device to perform further operations comprising:

dequeuing the aggregated link-state information from the change list queue; and transmitting the aggregated link-state information to the peer BGP speaker.

17. The non-transitory machine-readable medium of claim 16, wherein the aggregated link-state information is transmitted to the peer BGP speaker via Border Gateway Protocol Link-State (BGP-LS).

18. The non-transitory machine-readable medium of claim 14, wherein the computer code, when executed by the set of one or more processors of the network device, causes the network device to perform further operations comprising:

executing an Interior Gateway Protocol (IGP) in the network; and updating the link-state information stored in the link-state database according to the IGP.

19. The non-transitory machine-readable medium of claim 18, wherein the IGP is Intermediate System to Intermediate System (IS-IS).

20. The non-transitory machine-readable medium of claim 18, wherein the IGP is Open Shortest Path First (OSPF).

* * * * *